US008050226B2

(12) United States Patent
Park et al.

(10) Patent No.: US 8,050,226 B2
(45) Date of Patent: Nov. 1, 2011

(54) METHOD OF TRANSMITTING CONTROL SIGNAL IN WIRELESS COMMUNICATION SYSTEM

(75) Inventors: Sung Jun Park, Anyang-si (KR); Young Dae Lee, Anyang-si (KR); Seung June Yi, Anyang-si (KR); Sung Duck Chun, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/449,158

(22) PCT Filed: Apr. 30, 2008

(86) PCT No.: PCT/KR2008/002456
§ 371 (c)(1), (2), (4) Date: Jul. 24, 2009

(87) PCT Pub. No.: WO2008/133477
PCT Pub. Date: Nov. 6, 2008

(65) Prior Publication Data
US 2010/0027413 A1   Feb. 4, 2010

(30) Foreign Application Priority Data
Apr. 30, 2007   (KR) .................. 10-2007-0042213

(51) Int. Cl.
*H04W 4/00* (2009.01)

(52) U.S. Cl. .................. 370/329; 370/333; 370/216

(58) Field of Classification Search .................. 370/216, 370/329
See application file for complete search history.

(56) References Cited

U.S. PATENT DOCUMENTS

| | | | |
|---|---|---|---|
| 5,630,061 A * | 5/1997 | Richter et al. ................. | 709/227 |
| 7,027,811 B2 * | 4/2006 | Pedlar ........................... | 455/425 |
| 7,155,261 B2 * | 12/2006 | Chen ............................ | 455/574 |
| 7,209,747 B2 * | 4/2007 | Chen ............................ | 455/450 |
| 7,356,146 B2 * | 4/2008 | Yi et al. ....................... | 380/262 |
| 2003/0016698 A1 * | 1/2003 | Chang et al. ................. | 370/469 |
| 2004/0009786 A1 * | 1/2004 | Terry ........................... | 455/522 |
| 2004/0208160 A1 * | 10/2004 | Petrovic et al. .............. | 370/350 |
| 2005/0226239 A1 * | 10/2005 | Nishida et al. ............... | 370/389 |
| 2008/0064390 A1 * | 3/2008 | Kim .............................. | 455/425 |
| 2008/0130488 A1 * | 6/2008 | Kuo .............................. | 370/216 |
| 2008/0130492 A1 * | 6/2008 | Kuo .............................. | 370/226 |

FOREIGN PATENT DOCUMENTS

EP   1408658 A2   4/2004

* cited by examiner

*Primary Examiner* — Ricky Ngo
*Assistant Examiner* — Rasheed Gidado
(74) *Attorney, Agent, or Firm* — McKenna Long & Aldridge LLP

(57) ABSTRACT

A method of transmitting a control signal in a wireless communication system includes transmitting a control signal on an uplink channel, determining whether an unrecoverable error, which cannot be corrected in a specific layer, is detected during the transmission of the control signal and if the unrecoverable error is detected, transmitting a message which informs that the unrecoverable error is detected. A deadlock due to an unrecoverable error in the specific layer can be prevented.

5 Claims, 6 Drawing Sheets

METHOD OF TRANSMITTING CONTROL SIGNAL IN WIRELESS COMMUNICATION SYSTEM

This application claims priority to International Application No. PCT/KR2008/002456 filed on Apr. 30, 2008, which claims priority to Korean Patent Application No. 10-2007-0042213 filed on Apr. 30, 2007, both of which are incorporated by reference for all purposes as if fully set forth herein.

TECHNICAL FIELD

The present invention relates to wireless communications, and more particularly, to a method of avoiding a deadlock which occurs during transmission of a control signal in a wireless communication system.

BACKGROUND ART

Third generation partnership project (3GPP) mobile communication systems based on a wideband code division multiple access (WCDMA) radio access technology are widely spread all over the world. High-speed downlink packet access (HSDPA) that can be defined as a first evolutionary stage of WCDMA provides 3GPP with a radio access technique that is highly competitive in the mid-term future. However, since requirements and expectations of users and service providers are continuously increased and developments of competing radio access techniques are continuously in progress, new technical evolutions in 3GPP are required to secure competitiveness in the future. Reduction of cost per bit, increase of service availability, flexible use of frequency bands, simple structure and open interface, proper power consumption of a user equipment (UE), and the like are defined as requirements.

In general, layers of a radio interface protocol between a UE and a network can be classified into L1 layer (a first layer), L2 layer (a second layer), and L3 layer (a third layer) based on the lower three layers of the open system interconnection (OSI) model that is well-known in a communication system. Each layer operates independently. When errors occur, each layer can independently perform a basic operation for correcting the errors. However, some errors may not be able to be independently recovered in a specific layer. Such an error is called an unrecoverable error. When the unrecoverable error occurs, the specific layer is continuously in an error condition, which leads to a deadlock.

Accordingly, there is a need for a method of correcting an unrecoverable error that occurs in a specific layer.

DISCLOSURE OF INVENTION

Technical Problem

The present invention provides a method of avoiding a deadlock when an unrecoverable error occurs in a specific layer.

The present invention also provides a method of transmitting a control signal to deal with a deadlock.

Technical Solution

According to an aspect of the present invention, a method of transmitting a control signal in a wireless communication system includes transmitting a control signal on an uplink channel, determining whether an unrecoverable error, which cannot be corrected in a specific layer, is detected during the transmission of the control signal and if the unrecoverable error is detected, transmitting a message which informs that the unrecoverable error is detected.

According to another aspect of the present invention, a method of transmitting a control signal in a wireless communication system includes transmitting a control signal on an uplink channel, determining whether an unrecoverable error, which cannot be corrected in a MAC layer, is detected on the transmission of the control signal and if the unrecoverable error is detected, transmitting a cell update message.

Advantageous Effects

A deadlock due to an unrecoverable error in a medium access control (MAC) layer can be avoided in a wireless communication system. In particular, service quality can be improved by reducing a time in which communication is unavailable due to the deadlock.

MODE FOR THE INVENTION

Figure 1:
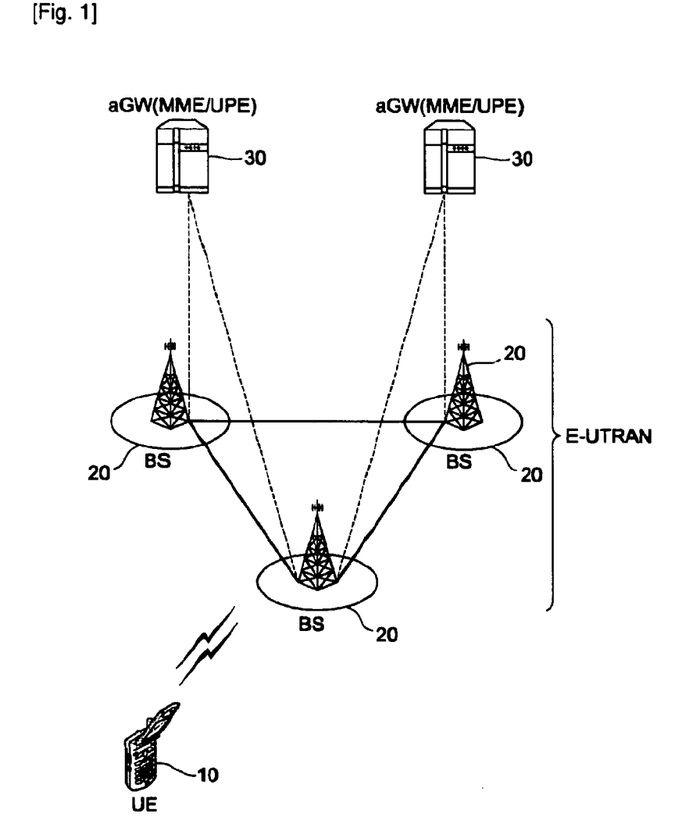
FIG. 1 shows a structure of a wireless communication system.

FIG. 1 shows a structure of a wireless communication system. The wireless communication system may have a network structure of an evolved-universal mobile telecommunications system (E-UMTS). The E-UMTS may be referred to as a long-term evolution (LTE) system. The wireless communication system can be widely deployed to provide a variety of communication services, such as voices, packet data, etc.

Referring to FIG. 1, an evolved-UMTS terrestrial radio access network (E-UTRAN) includes at least one base station (BS) 20. A user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc.

There are one or more cells within the coverage of the BS 20. Interfaces for transmitting user traffic or control traffic may be used between the BSs 20. Hereinafter, downlink is defined as a communication link from the BS 20 to the UE 10, and uplink is defined as a communication link from the UE 10 to the BS 20.

The BS 20 provides the UE 10 with an end-to-end point of a user plane and a control plane. The BSs 20 are interconnected by means of an X2 interface, and may have a meshed network structure in which the X2 interface always exists between the neighboring BSs 20.

The BSs 20 are also connected by means of an S1 interface to an evolved packet core (EPC), more specifically, to an access gateway (aGW) 30. The aGW 30 provides an end-to-end point for a session and mobility management function of the UE 10. The S1 interface may be provided between the BS 20 and the aGW 30 so that a plurality of nodes can be interconnected in a many-to-many manner. The aGW 30 can be classified into a part for processing user traffic and a part for processing control traffic. In this case, for inter-communication, a new interface may be used between an aGW for processing new user traffic and an aGW for processing new control traffic. The aGW 30 is also referred to as a mobility management entity/user plane entity (MME/UPE).

Layers of a radio interface protocol between a UE and a network can be classified into L1 layer (a first layer), L2 layer (a second layer), and L3 layer (a third layer) based on the lower three layers of the open system interconnection (OSI) model that is well-known in a communication system. A physical layer belongs to the first layer and provides an information transfer service on a physical channel. A radio resource control (RRC) layer belongs to the third layer and serves to control radio resources between the UE and the network. The UE and the network exchange RRC messages via the RRC layer. The RRC layer may be located in network nodes (i.e., the BS 20, the aGW 30, etc.) in a distributed manner, or may be located only in the BS 20 or the aGW 30.

The radio interface protocol horizontally includes a physical layer, a data link layer, and a network layer, and vertically includes a user plane for data information transfer and a control plane for control signaling delivery.

Figure 2:
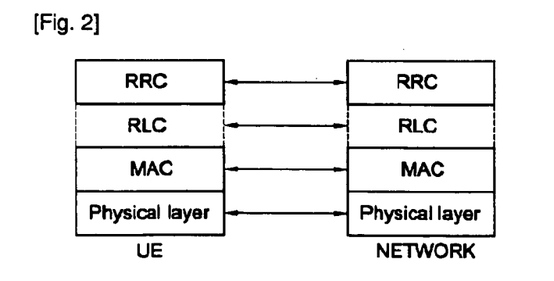
FIG. 2 is a diagram showing a control plane of a radio interface protocol.
Figure 3:
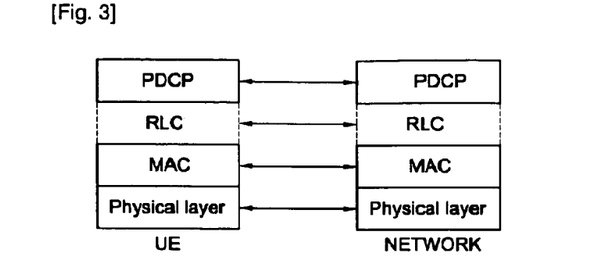
FIG. 3 is a diagram showing a user plane of a radio interface protocol.

FIG. 2 is a diagram showing a control plane of a radio interface protocol. FIG. 3 is a diagram showing a user plane of the radio interface protocol. In FIGS. 2 and 3, a structure of the radio interface protocol between a UE and an E-UTRAN is based on the third generation partnership project (3GPP) radio access network standard.

Referring to FIGS. 2 and 3, a physical layer, i.e., a first layer, provides an upper layer with an information transfer service on a physical channel. The physical layer is coupled with a medium access control (MAC) layer, i.e., an upper layer of the physical layer, via a transport channel. Data is transferred between the MAC layer and the physical layer on the transport channel. In addition, data is transferred between different physical layers, i.e., between physical layers of a transmitting side and a receiving side.

The MAC layer in a second layer provides services to a radio link control (RLC) layer, i.e., an upper layer of the MAC layer, via a logical channel. The RLC layer in the second layer supports reliable data transfer. Functions of the RLC layer can be implemented as a function block included in the MAC layer. In this case, the RLC layer (indicated by a dotted line in the figure) may not exist. The RLC layer has three operation modes, i.e., a transparent mode (TM), an unacknowledged mode (UM), and an acknowledged mode (AM) according to a data transfer method. A method of processing and transmitting an RLC service data unit (SDU) varies depending on each operation mode. One or more RLC entities can exist in the RLC layer. Each RLC entity operates in one fixed operation mode. An AM RLC provides a bidirectional data transfer service and supports re-transmission when an RLC protocol data unit (PDU) is not successfully transmitted. The RLC PDU transmitted in the AM RLC is defined as an AM data PDU (AMD PDU). The RLC SDU transmitted from an upper layer is generated into the AMD PDU having a fixed size.

A packet data convergence protocol (PDCP) layer belonging to the second layer performs a header compression function. When transmitting an Internet protocol (IP) packet such as an IPv4 packet or an IPv6 packet, the header of the IP packet may contain relatively large and unnecessary control information. The PDCP layer reduces the header size of the IP packet so as to efficiently transmit the IP packet through a radio interface.

An RRC layer belonging to a third layer is defined only in the control plane. The RRC layer serves to control the logical channel, the transport channel, and the physical channel in association with configuration, reconfiguration, and release of radio bearers (RBs). An RB is a service provided by the second layer for data transmission between the UE and the E-UTRAN.

A downlink transport channel transmits data from the network to the UE. Examples of the downlink transport channel include a broadcast channel (BCH) for transmitting system information and a downlink-shared channel (DL-SCH) for transmitting user traffic or control messages. User traffic of downlink multicast or broadcast services or control messages can be transmitted on the DL-SCH or a downlink-multicast channel (DL-MCH). An uplink transport channel transmits data from the UE to the network. Examples of the uplink transport channel include a random access channel (RACH) for transmitting initial control messages and an uplink-shared channel (UL-SCH) for transmitting user traffic or control messages.

Figure 4:
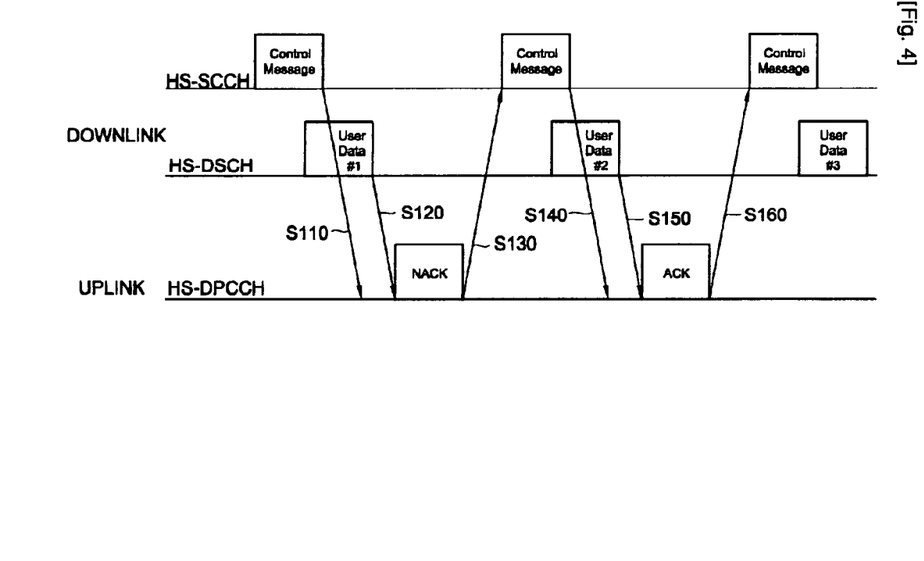
FIG. 4 shows an example of a hybrid automatic repeat request (HARQ) scheme.

FIG. 4 shows an example of a hybrid automatic repeat request (HARQ) scheme. This example shows detailed implementation of HARQ applied to a downlink physical layer in a wireless packet communication system.

Referring to FIG. 4, a BS transmits a control message to a UE on a downlink control channel (step S110). At a time point associated with the control message, the BS transmits user data to the UE on a downlink shared channel (step S120). The downlink control channel may be a high speed-shared control channel (HS-SCCH). The downlink shared channel may be a high speed-downlink shared channel (HS-DSCH). The control message includes information regarding the UE which receives a packet, information regarding a format (e.g., a coding rate, a modulation scheme, a data amount, etc.) of the packet to be transmitted to the UE, etc. The UE receives the downlink control channel and thus knows the format of the packet to be delivered to the UE as well as a transmission time. Accordingly, the UE can receive the packet.

After receiving the packet, the packet is subjected to decoding. If the UE fails in decoding the packet, the UE transmits a non-acknowledgement (NACK) signal to the BS (step S130). The NACK signal may be transmitted on a high speed-dedicated physical control channel (HS-DPCCH). Upon receiving the NACK signal, the BS senses that packet transmission to the UE has failed, and thus retransmits the same data at a proper time point in the same packet format or a new packet format (steps S140 and S150). In this case, the UE may attempt decoding again by combining the re-transmitted packet and the previous packet, which has been previously received but has failed in decoding, in various manners.

Otherwise, if the UE successfully decodes the received packet, the UE transmits an acknowledgement (ACK) signal to the BS (step S160). The ACK signal may be transmitted on the HS-DPCCH, i.e., an uplink channel. Upon receiving the ACK signal, the BS senses that packet transmission to the UE has been successful, and thus transmits a next packet. A channel used in the transmission of the ACK/NACK signal is referred to as an ACK/NACK channel.

Now, an RRC state in a UMTS will be described.

The RRC state is defined in order to identify an operation mode of a UE and a communication state. The RRC state can be classified into an idle mode and a connected mode. When an RRC connection is established between the UE and a UTRAN, the UE transitions from the idle mode to the connected mode. According to a physical channel type, the connected mode can be classified into four states, i.e., cell_dedicated channel (Cell_DCH), cell_forward access channel (Cell_FACH), cell_paging channel (Cell_PCH), and UTRAN registration area_paging channel (URA_PCH).

In the Cell_DCH state, the UE can use a dedicated physical channel assigned to the UE. A transition to the Cell_DCH state may be made when the UE transitions from the idle mode due to the activation of the RRC connection or when the dedicated physical channel is assigned in the Cell_FACH state. The Cell_DCH state is suitable for supporting a high-speed data transfer service and is also used for supporting real-time services. If data to be transmitted is small in amount, the data can be transmitted in the Cell_FACH state. If data is not transmitted for a long period of time, the data can be transmitted in the Cell_PCH state or the URA_PCH state.

The Cell_FACH state is a state in which a dedicated channel is not assigned to the UE and thus a common channel is used. The Cell_FACH state is generally used when an amount of traffic exchanged between the UE and the UTRAN is small. The UE continuously observes a forward access channel (FACH) while receiving data. The UE uses a random access channel (RACH) when data is transmitted in uplink transmission. Location information of the UE can be reported to the UTRAN according to a cell update procedure. Therefore, the UTRAN can know the location information of the UE in a cell level. Since the common channel is used in transmission, radio network temporary identity (RNTI) information for identifying the UE may be included in MAC header information. Similarly to the Cell_DCH state, the Cell_FACH state can be transitioned from the idle mode after the RRC connection is established, and can be transitioned to other states according to an amount of transmitted traffic.

In the Cell_PCH state, the dedicated channel is not assigned to the UE, and a dedicated logical channel cannot be used. The UE, which is generally in the Cell_FACH state or the Cell_DCH state, may transition to the Cell_PCH state after data is not transmitted for a long period of time. The UE can receive paging information through a paging channel (PCH). Since the PCH is observed by using a discontinuous reception (DRX) function, the UE can consume less power than when in the Cell_FACH state. The location information of the UE can be known in the cell level. If the UE performs the cell update procedure, the UE temporarily transitions to the Cell_FACH state and then performs the cell update procedure. Thereafter, if there is no need to stay in the Cell_FACH state, the UE returns to the Cell_PCH state.

The URA_PCH state is almost similar to the Cell_PCH state. However, the UE can transition to the URA_PCH state when the cell update procedure results in an overload due to a large mobility of the UE. A UTRAN registration area (URA) is a region consisting of one or more cells and provides an effective method in which the UTRAN can support the large mobility of the UE. The URA is known intrinsically, and thus a URA configuration cannot be known in a core network.

Now, the cell update procedure in the UMTS will be described.

The cell update procedure is used when the UE in the Cell_FACH state or the Cell_PCH state wants to report location information of the UE in a cell level to the UTRAN. The UE transmits a cell update message and then updates the location information of the UE. The cell update message is transmitted by using a signaling radio bearer (SRB) #1. The cell update message includes a start value in association with data security and also includes a cell update cause or the like.

The cell update message is transmitted due to the following causes as shown in Table 1. For this, the section 8.3.1.1 of 3GPP TS 25.331 V7.4.0 (2007-03) "Technical Specification Group Radio Access Network; Radio Resource Control (RRC); Protocol Specification (Release 7)" can be incorporated herein by reference.

TABLE 1

| Cell Update Cause | Description |
| --- | --- |
| Uplink data transmission | If a UE is in URA_PCH or Cell_PCH state and has uplink RLC PDU to transmit. |
| Paging response | If a UE in URA_PCH or CELL_PCH state receives a PAGING TYPE 1 message fulfilling for initiating a cell update procedure. |
| Radio link failure | If a UE is in CELL_DCH state and the criteria for radio link failure are met. |
| Re-entering service error | If a UE is in CELL_FACH or CELL_PCH state and if the UE has been out of service area and re-enters service area. |
| RLC unrecoverable error | If a UE detects RLC unrecoverable error in an AM RLC entity. |
| Cell reselection | If a UE is in CELL_FACH or CELL_PCH state and the UE performs cell re-selection. |
| Periodical cell update | If a UE is in CELL_FACH or CELL_PCH state and if periodic updating has been configured by a timer. |

After correctly updating the location information of the UE, the UTRAN transmits a cell update confirm message to the UE. The message may include not only response, information for the cell update procedure but also newly assigned RNTI information and data security-related parameters. If the cell update confirm message includes the data security-related information or the new RNTI information, the UE transmits a mobility information complete message to the UTRAN as a response. In addition thereto, the cell update confirm message may include information on release/reconfiguration of RBs, information on reconfiguration of a transport channel and a physical channel, etc. If such information is included, in response thereto, the UE transmits to the URTAN an RB reconfiguration complete message, a transport channel reconfiguration complete message, and a physical channel reconfiguration complete message.

An RLC unrecoverable error is one of the cell update causes and is related to an unrecoverable error of an RLC layer. If the unrecoverable error occurs in an AM RLC layer, this is reported to the RRC layer and thus the cell update procedure is performed in order to correct the error.

However, if the unrecoverable error occurs in a MAC layer, there is no method of correcting the error. Thus, the UE is continuously under the unrecoverable error condition, which may lead to a deadlock. Therefore, there is a possibility of a problem that the unrecoverable error is generated in the MAC layer, and the present invention suggests a method of solving the problem.

Figure 5:
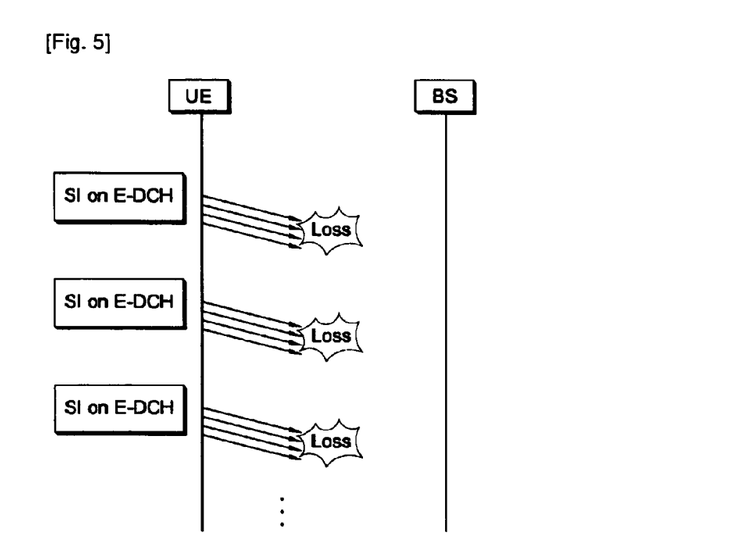
FIG. 5 shows an example of an unrecoverable error occurring in a media access control (MAC) layer in a process of transmitting scheduling information.

FIG. 5 shows an example of an unrecoverable error occurring in a MAC layer in a process of transmitting scheduling information (SI). The SI is transmitted on an enhanced dedicated channel (E-DCH). The E-DCH is used when a UE transmits data to a UTRAN in uplink transmission. The E-DCH can transmit uplink data at a higher speed in comparison with a DCH. For high-speed data transmission, the E-DCH uses various techniques, such as hybrid ARQ (HARQ), adaptive modulation and coding (AMC), BS controlled scheduling, etc. For the E-DCH, a BS transmits to the UE downlink control information for controlling E-DCH transmission of the UE. The downlink control information may include response information (i.e., ACK/NACK signals) for the HARQ, radio resource allocation information for the BS controlled scheduling, etc.

The scheduling information (SI) is control information used by UEs to indicate to their serving BS the amount of resources they require. The SI is used to provide the serving BS with a better view of the amount of system resources needed by the UE and the amount of resources it can actually make use of. The SI includes a highest priority logical channel ID (HLID), a total E-DCH buffer status (TEBS), a highest priority logical channel buffer status (HLBS) and a UE power headroom (UPH).

The HLID field identifies unambiguously the highest priority logical channel with available data. If multiple logical channels exist with the highest priority, the one corresponding to the highest buffer occupancy will be reported. The length of the HLID is 4 bits.

The TEBS field identifies the total amount of data available across all logical channels for which reporting has been requested by the RRC and indicates the amount of data in number of bytes that is available for transmission and retransmission in RLC layer. When MAC is connected to an AM RLC entity, control PDUs to be transmitted and RLC PDUs outside the RLC transmit window shall also be included in the TEBS.

The HLBS field indicates the amount of data available from the logical channel identified by HLID, relative to the highest value of the buffer size range reported by TEBS when the reported TEBS index is not 31, and relative to 50000 bytes when the reported TEBS index is 31. The length of HLBS is 4 bits.

The UPH field indicates the ratio of the maximum UE transmission power and the corresponding DPCCH code power. The length of UPH is 5 bits.

The SI is control information generated in the MAC layer in an independent manner from data delivered from another upper layer according to situations. The SI alone can be transmitted to the BS. The BS can allocate a proper radio resource to the UE only when the BS successfully receives the SI. Therefore, it can be said that the SI is very important control information. In addition, the SI may be configured such that the UE periodically transmits the SI according to a transmit timer which is set by the BS.

The SI may not be successfully transmitted according to a channel condition, which may result in an error that cannot be recovered in the MAC layer. If there is no method of correcting such an unrecoverable error, the UE may experience a deadlock in which only the SI is continuously transmitted.

Therefore, when transmitting a control signal generated in a specific layer, the deadlock resulted from the unrecoverable error needs to be corrected. For this, a specific condition value is defined so that the generation of error is reported to an upper layer (e.g., the RRC layer) if the condition value is satisfied. Upon receiving the report indicating the generation of error, the upper layer performs a specific procedure such as the cell update procedure.

Figure 6:
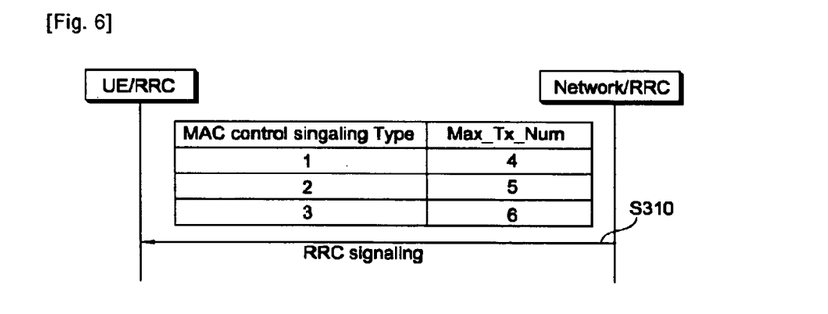
FIG. 6 is a flow diagram showing a method of correcting unrecoverable errors according to an embodiment of the present invention.

FIG. 6 is a flow diagram showing a method of correcting unrecoverable errors according to an embodiment of the present invention.

Referring to FIG. 6, in order to define an unrecoverable error of a MAC layer, a BS determines an error condition value for a UE through RRC signaling. The RRC signaling may be a system information message, a paging message, a radio bearer setup message, a radio bearer reconfiguration message, etc.

The error condition value may be a maximum transmission number (hereinafter, Max_Tx_Num) or an error timer value. The error condition value may vary depending on a MAC control signaling type.

A case where the error condition value is the Max_Tx_Num will be described as an example. In an RRC layer of the network, the Max_Tx_Num is defined according to a control signal generated in the MAC layer, and is then reported to the UE through an RRC message.

The Max_Tx_Num is dependent on the transmission of the control signal to be used in the MAC layer. In general, the Max_Tx_Num does not represent the number of times of performing retransmission in a HARQ operation. In case of an E-DCH of a UMTS, for example, SI is transmitted along with retransmission of HARQ when a transmit timer expires. A transmission number (hereinafter, Tx_Num) is defined when the SI is transmitted at the expiration of the transmit timer. In the transmission of the control signal, the Max_Tx_Num represents a maximum number of times of performing transmission in which the control signal is transmitted according to a timer or the like under the condition that BS feedback information depending on the control signal is not received. For example, assume that a control signal 1 is transmitted from the MAC layer, and the BS transmits response information, i.e., feedback information 1. In addition, assume that the control signal 1 is periodically transmitted every 30 ms, and the Max_Tx_Num is 3. Then, the UE transmits the control signal 1 to the BS and waits to receive the feedback information 1 from the BS. If the transmit timer set to 30 ms expires, the UE retransmits the control signal 1 to the BS and increments the Tx_Num by 1. Then, the UE waits again to receive the feedback information 1. Such a procedure is repeated until the Tx_Num is equal to the Max_Tx_Num. Then, the MAC layer stops the transmission of the control signal 1 and reports to an upper layer that an unrecoverable error is generated in the MAC layer.

Upon receiving the report indicating the generation of the unrecoverable error from the MAC layer, the RRC layer can perform the cell update procedure. That is, in addition to the causes of the generation of the cell update message as shown in Table 1 above, another cause (i.e., 'MAC unrecoverable error') is additionally defined.

Figure 7:
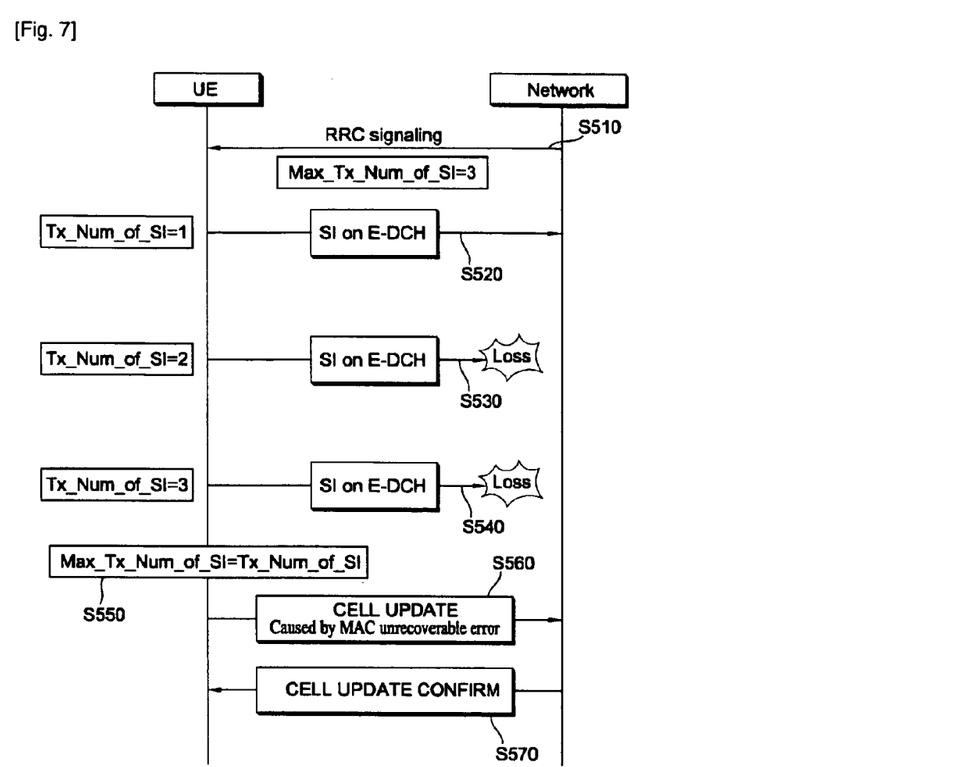
FIG. 7 is a flow diagram showing a method of correcting unrecoverable errors according to another embodiment of the present invention.

FIG. 7 is a flow diagram showing a method of correcting unrecoverable errors according to another embodiment of the present invention.

Referring to FIG. 7, a BS informs a UE of a maximum transmission number corresponding to a maximum number of times of transmitting SI of an E-DCH (hereinafter, this maximum transmission number is simply referred to as Max_Tx_Num_of_SI) (step S510). The Max_Tx_Num_of_SI is a maximum number of times of transmitting the SI by using a transmit timer in a state where the SI generated in a MAC layer is independently transmitted instead of being transmitted along with other superordinate data and in a state where no scheduling allocation information (i.e., absolute allocation or relative allocation) can be received from the BS. It will be assumed herein that the Max_Tx_Num_of_SI is 3.

The UE has a condition value indicating the number of times of transmitting the SI, that is, an SI transmission number (hereinafter, Tx_Num_of_SI). The Tx_Num_of_SI is a value that is incremented by 1 whenever the SI is transmitted according to the transmit timer in a state where the SI is independently transmitted and no scheduling allocation information is received from the BS.

The UE transmits the SI (step S520). It will be assumed herein that no scheduling allocation information is transmitted according to an uplink channel condition or a scheduling condition of the BS. The SI is not successfully transmitted and thus the Tx_NUM_of_SI is 1.

If the UE fails again to transmit the SI, the Tx_NUM_of_SI is incremented by 1 (step S530). Thereafter, if the UE fails again to transmit the SI, the Tx_NUM_of_SI is incremented by 1 (step S540).

If the Tx_Num_of_SI is equal to the Max_Tx_Num_of_SI, the UE reports to an RRC layer that an MAC unrecoverable error occurs (step S550).

The RRC layer of the UE performs a cell update procedure by transmitting to the BS a cell update message including a cause of the MAC unrecoverable error (step S560).

The BS informs the UE of the completion of the cell update procedure through a cell update confirm message (step S570).

Figure 8:
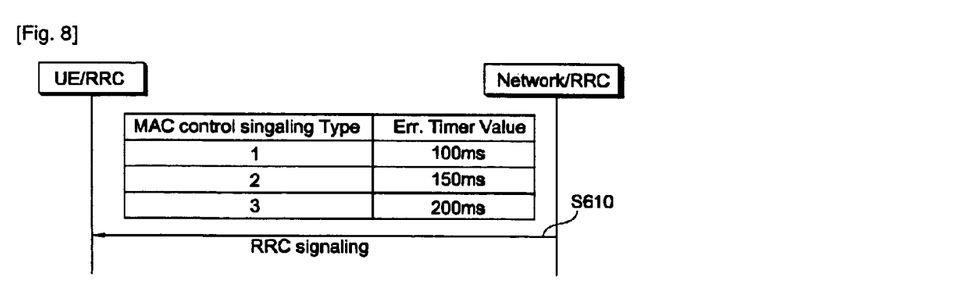
FIG. 8 is a flow diagram showing a method of correcting unrecoverable errors according to still another embodiment of the present invention.

FIG. 8 is a flow diagram showing a method of correcting unrecoverable errors according to still another embodiment of the present invention. Herein, an error condition value is an error timer value.

Referring to FIG. 8, an RRC layer of a network defines an error timer so that an MAC unrecoverable error can be determined when a control signal generated in a MAC layer of a UE is transmitted, and the RRC layer also informs the UE of the error timer value through an RRC message (step S610). The error timer value may vary depending on types of the control information generated in the MAC layer.

After the control signal is transmitted, the error timer corresponding to the control signal starts. The error timer stops when the control information is successfully transmitted to a BS and feedback information for the control signal is received from the BS. If the error timer expires, it is reported to an upper layer that an unrecoverable error of the MAC layer is detected.

For example, assume that, upon transmitting control information 1 generated in the MAC layer, the BS transmits feedback information 1 to the UE as response information. In addition, assume that the error timer is set to 1 sec in the control signal 1. Then, the error timer starts before/after the control signal 1 is transmitted, and the UE waits to receive the feedback information 1 from the BS. If the feedback information 1 is not received from the BS until the error timer expires, the UE reports to the upper layer occurrence of the unrecoverable error of the MAC layer.

Figure 9:
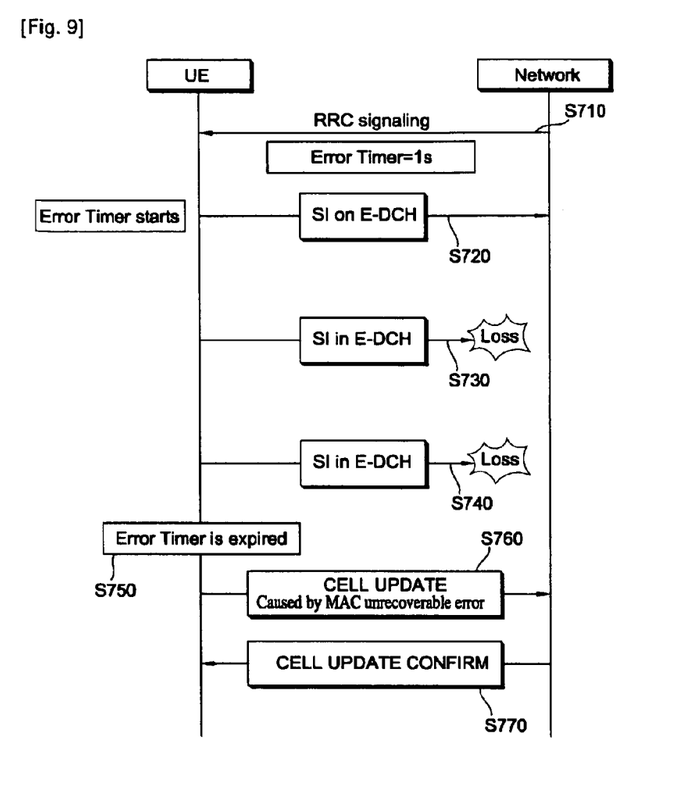
FIG. 9 is a flow diagram showing a method of correcting unrecoverable errors according to still another embodiment of the present invention.

FIG. 9 is a flow diagram showing a method of correcting unrecoverable errors according to still another embodiment of the present invention.

Referring to FIG. 9, a BS informs a UE an error timer value for determining whether an unrecoverable error of a MAC layer is detected during the transmission of SI of an E-DCH through an RRC signal (step S710). It will be assumed herein that the error timer value is 1.

The UE transmits the SI (step S720). An error timer starts when the SI is transmitted.

The UE periodically retransmits the SI in a state where no scheduling allocation information is received from the BS (steps S730 and S740).

If the error timer expires, the UE reports to an upper layer occurrence of the MAC unrecoverable error (step S750). If there is any scheduling allocation information transmitted to the UE before the error timer expires, the error timer stops.

According to a report indicating the occurrence of error in the MAC layer, an RRC layer of the UE performs a cell update procedure through a cell update message including a cause of the MAC unrecoverable error (step S760).

The BS informs the UE of the completion of the cell update process through a cell update confirm message (step S770).

Figure 10:
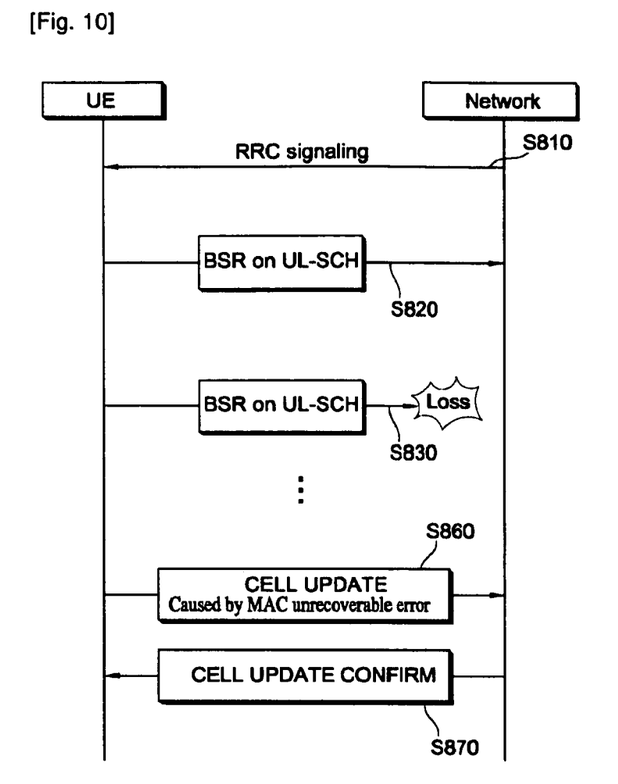
FIG. 10 is a flow diagram showing a method of correcting unrecoverable errors according to still another embodiment of the present invention.

FIG. 10 is a flow diagram showing a method of correcting unrecoverable errors according to still another embodiment of the present invention.

Referring to FIG. 10, a BS informs a UE of an error condition value for determining whether an unrecoverable error of a MAC layer is detected during the transmission of a buffer status reporting (BSR) through an RRC signal (step S810). The error condition value may be a maximum transmission number or an error timer value. The BSR is used to provide the serving BS with information about the amount of data in the uplink buffers of the UE. The BSR can be triggered if a transmit timer expires.

The UE transmits the BSR on a UL-SCH (step S820). The BSR is a part of a MAC PDU. The MAC PDU consists of a MAC header, zero or more MAC service data units (MAC SDU), and zero or more MAC control elements. A MAC PDU header consists of one or more MAC PDU sub-headers. Each sub-header corresponding to either a MAC SDU or a MAC control element. MAC PDU sub-headers have the same order as the corresponding MAC SDUs and MAC control elements. MAC control elements, except Padding BSR, are always placed before any MAC SDU. Padding BSR means that uplink resources are allocated and number of padding bits is larger than the size of the Buffer Status Report MAC control element. Padding BSR occurs at the end of the MAC PDU.

The BSR MAC control element carries BSR information. The BSR MAC control element consists of either a short BSR format or a long BSR format. The short BSR format includes one LCG ID (Logical Channel Group ID) field and one corresponding buffer size field. The long BSR format includes four buffer size fields. The LCG ID identifies the group of logical channel(s) which buffer status is being reported. The length of the field is 2 bits. The buffer size field identifies the total amount of data available across all logical channels of a logical channel group after the MAC PDU has been built. The amount of data is indicated in number of bytes. The length of this field is 6 bits.

The UE periodically transmits the BSR (step S830).

If the error condition value is satisfied, the UE reports to an RRC layer that the MAC unrecoverable error is detected, and the RRC layer performs a cell update procedure through a cell update message including a cause of the MAC unrecoverable error (step S860). The BS informs the UE of the completion of the cell update procedure through a cell update confirm message (step S870).

All functions described above may be performed by a processor such as a microprocessor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of transmitting a control signal in a wireless communication system, the method performed by a user equipment (UE) capable of operating in a cell dedicated channel (Cell_DCH) state, a cell forward access (Cell_FACH) state, a cell paging channel (Cell_PCH) state, or a universal terrestrial radio access network registration area paging channel (URA_PCH) state, the method comprising:

receiving, by the UE, a control message indicating an error condition from a base station (BS) through radio resource control (RRC) signaling, wherein the error condition includes an error timer value and a maximum transmission number, wherein the error timer value and the maximum transmission number are determined by the BS, wherein the UE operates in the Cell_FACH state or the Cell_PCH state;

starting an error timer when receiving the error timer value, wherein the error timer is expired when a timer value of the error timer is equal to the error timer value;

transmitting a scheduling information (SI) message, which is generated in a medium access control (MAC) layer of the UE on an enhanced dedicated channel (E-DCH), if the error timer is not expired and the total number of unsuccessful transmissions of the SI message to be transmitted to the BS is less than the maximum transmission number, wherein the SI message includes scheduling information, which informs the BS of an amount of resources required by the UE;

determining whether an unrecoverable error, which cannot be corrected in the MAC layer, is detected, wherein the determination is performed based on whether scheduling allocation information is received while the error timer is running, wherein the scheduling allocation information is transmitted by the BS in response to the SI message; and if the unrecoverable error is detected, transmitting a cell update message which informs that the unrecoverable error is detected.

2. The method of claim 1, wherein the SI message further includes information on an amount of data in an uplink buffer of the user equipment.

3. The method of claim 1, wherein the SI message further includes a highest priority logical channel ID (HLID), a total E-DCH buffer status (TEBS), a highest priority logical channel buffer status (HLBS), and a UE power headroom (UPH).

4. A wireless communication device capable of operating in a cell dedicated channel (Cell_DCH) state, a cell forward access (Cell_FACH) state, a cell paging channel (Cell_PCH) state, or a universal terrestrial radio access network registration area paging channel (URA_PCH) state, the device comprising:

a radio frequency (RF) unit for transmitting radio signals; and a processor coupled to the RF unit and configured to:

receive, a control message indicating an error condition from a base station (BS) through radio resource control (RRC) signaling, wherein the error condition includes an error timer value and a maximum transmission number, wherein the error timer value and the maximum transmission number are determined by the BS, wherein the wireless communication device operates in the Cell_FACH state or the Cell_PCH state;

start an error timer when receiving the error timer value, wherein the error timer is expired when a timer value of the error timer is equal to the error timer value;

transmit a scheduling information (SI) message, which is generated in a medium access control (MAC) layer of the wireless communication device on an enhanced dedicated channel (E-DCH), if the error timer is not expired and the total number of unsuccessful transmissions of the SI message to be transmitted to the BS is less than the maximum transmission number, wherein the SI message includes scheduling information which, informs the BS of an amount of resources required by the wireless communication device;

determine whether an unrecoverable error, which cannot be corrected in the MAC layer, is detected, wherein the determination is performed based on whether scheduling allocation information is received while the error timer is running, wherein the scheduling allocation information is transmitted by the BS in response to the SI message;

if the unrecoverable error is detected, transmit a cell update message which informs that the unrecoverable error is detected.

5. The wireless communication device of claim 4, wherein the SI message further includes a highest priority logical channel ID (HLID), a total E-DCH buffer status (TEBS), a highest priority logical channel buffer status (HLBS), and a wireless communication device power headroom (UPH).

* * * * *